United States Patent
Kiehl et al.

[15] 3,652,306
[45] Mar. 28, 1972

[54] HIGH DENSITY REFRACTORY SHAPES AND METHOD FOR PRODUCTION OF SAME

[72] Inventors: Jean-Pierre Kiehl; Georges Valentin, both of Lyon, France

[73] Assignee: Societe Generale des Produits Refractaires, Paris, France

[22] Filed: May 8, 1970

[21] Appl. No.: 35,890

Related U.S. Application Data

[63] Continuation-in-part of Ser. No. 662,276, Aug. 22, 1967, Pat. No. 3,536,505.

[30] Foreign Application Priority Data

Aug. 26, 1966  France......................................74294
Jan. 16, 1967  France......................................91257

[52] U.S. Cl....................................106/58, 106/59, 106/63
[51] Int. Cl. .........................................................C04b 35/04
[58] Field of Search.........................................106/58, 59, 63

[56] References Cited

UNITED STATES PATENTS 3,378,383  4/1968  Van Dreser..............................106/58
3,473,939  10/1969  Mayberry et al.........................106/59

*Primary Examiner*—James E. Poer
*Attorney*—Webb, Burden, Robinson & Webb

[57] ABSTRACT

High density burned basic refractory shapes having low porosity and creep deformation prepared from a brickmaking batch comprising dead burned magnesia, $Cr_2O_3$, $TiO_2$, chrome ore, calcinated dolomite and 3 percent to 6 percent recrystallization additions comprising calcium silicates smaller than $74\mu$. The batch is shaped and then fired at between 1,550° C. and 1,680° C. to form a transient viscous phase of high vapor pressure to form monocrystals and crystalline aggregates.

5 Claims, No Drawings

HIGH DENSITY REFRACTORY SHAPES AND METHOD FOR PRODUCTION OF SAME

RELATED APPLICATION

This is a continuation-in-part of our application Ser. No. 662,276, filed Aug. 22, 1967, now U.S. Pat. No. 3,536,505, entitled "High Density Materials and Method for Production of Same." That application claimed priority to French application Ser. No. PV 74,294, filed Aug. 26, 1966 and French application Ser. No. PV 91,257, filed Jan. 16, 1967.

Our invention relates in general to a high density refractory product and in particular to a high density, thermally stable low porosity refractory brick and to the method of producing the brick.

Our refractory bricks are generally magnesium oxide, one of the most commonly used oxides for industrial refractory applications. However, our invention is not limited solely to the use of magnesium oxide since we have found that the addition thereto of at least one other refractory oxide results in a thermally stable product having high density and low porosity.

Substantial advances have recently been made in high temperature sintering of crude raw refractory materials in order to obtain chamottes or refractory clays. Dead burned magnesia of high purity, low porosity and high density are now available, from magnesite and from hydrates of magnesia extracted from sea water.

These advances have not been carried over into the production of magnesia bricks, however. Invariably, these bricks are still produced with an open porosity of 15 percent or more. As a rule, these bricks begin to creep under the load from 1,350° C. to 1,400° C. due to the inadequate development of periclase monocrystals. This is true even when the bricks are fixed at temperatures exceeding 1,650° C.

Although it is possible to produce magnesia fragments or parts of very low porosity or nonexistent open porosity, this applies only to very small fragments or parts obtained by sintering a composition of very fine granulation at very high temperature. For example, a grain size smaller than half a millimeter, based on either caustic magnesia or dead roasted magnesia or on a mixture of the two, is required throughout. These fragments undergo a 10 to 15 percent shrinkage during firing. The problem of shrinkage and the high cost of the process prevent application of the process to the production of refractory products for use in iron metallurgy, cement production, glass-making, etc.

It is possible to produce products or parts of dense magnesia having a low porosity by electric furnace fusion, followed by casting and cooling in molds. This technique, however, suffers from the creation of shrinkage holes caused by the substantial difference in densities between liquid magnesia and crystalline magnesia.

Our invention overcomes these difficulties by providing an economical method for producing a refractory product of very low porosity and very high density having a remarkable structural homogeneity. These products are easily obtainable in standard sizes for use in industrial furnaces.

Briefly, this invention relates to burned basic refractory shapes or brick comprising at least 20 percent dead burned magnesia and methods of making them. Brick according to this invention includes, for example, high purity magnesia brick analyzing at least 92 percent MgO, magnesia-chrome ore brick, chrome ore-magnesia brick wherein the ratio of chrome ore to dead burned magnesia in the brickmaking batch varies from about 80:20 to 20:80. This invention further relates to magnesia brick having calcined dolomite, titania ($TiO_2$), and chrome oxide ($Cr_2O_3$) additions. The products are characterized by a homogeneous structure of periclase monocrystals or homogeneous combination of monocrystals of the crystalline raw materials. The crystals are substantially contiguous and of a size greater than the initial crystals. The crystals are each of substantially the same size. The products of crystalline aggregates formed by our process have a specific gravity at least equal to 3 and with an open porosity not more than 8 percent and generally less than 5 percent. The thermal stability is such that the deformation caused by creep will be lower than 0.5 percent after 24 hours at 1,500° C. followed by 100 hours at 1,500° C. under a load of 2 kg./cm². The products have a good mechanical strength when cold and a breaking modulus under bending stress that is at least two times higher than those of the conventional products of similar MgO content.

The monocrystals have a diameter greater than $20\mu$ and the crystalline aggregates each have a size between $200\mu$ and $800\mu$. The crystalline aggregates are generally separated by not more than very thin boundaries formed by the residue of the recrystallization addition utilized with the mixture and impurities that are not syncrystallized in the periclase lattice.

The process for obtaining our novel product comprises preparing a brickmaking batch comprising dead burned magnesia grain and other basic refractory materials. For example, it is also possible to start with a material having a magnesia content from 20 percent to 80 percent by weight and at least one other refractory material selected from the group consisting of $Cr_2O_3$, $TiO_2$, natural chromite, and calcinated dolomite. According to a preferred embodiment the brickmaking batch comprises only dead burned magnesite grains and a recrystallization addition as hereafter explained. The brickmaking batch is size-graded such that by weight at least 50 percent of the grain sizes lie between 5 mm. and 0.2 mm., and of this amount at least 50 percent are between 5 mm. and 1.5 mm.; less than 50 percent of the mixture is less than $200\mu$.

To this mixture is added from 3 to 6 percent by weight recrystallization additions comprising calcium silicate materials having a size less than $74\mu$ microns. The purpose of these additions is to promote the formation, during heating, of a transient viscous phase from which monocrystals will recrystallize larger than the initial monocrystals and align substantially contiguously. The phase should be sufficiently viscous to prevent deformation of the parts during firing. The major part of these additions is eliminated by volatization during firing.

The $SiO_2$—CaO system, at firing, allows the formation of silicates in ponderal proportions lying between 25 percent and 75 percent of CaO related to the $SiO_2$+CaO total. The calcium silicate materials hereafter, calcium silicates, that may be used as recrystallization additions according to this invention include compounds and mixtures of lime and silica. Hence, the silica portion of the recrystallization alone, in the form of quartz, cristobalite, vitreous silica, or associated with lime in the form of di- er tricalcic silicate, or released at high temperature from an unstable silicate such as zircon. The calcium oxide portion may be introduced in the form of oxide, carbonate, hydrate or silicate.

To this batch is added 0.2 to 1.0 percent organic binder, for example, bisulphite lye. This batch is then shaped by known means, for example, pressing, vibrating, ramming, etc. The shapes are then fired to a temperature between 1,500° C. and 1,650° C. for magnesia and between 1,600° C. and 1,680° C. for magnesia and at least one of the other refractory materials. The speed of the temperature rise and the maintenance of the temperature depend upon the conditions of each operation, in particular, on the volume of the constituents to be fired. The temperature may be maintained for a period between 2 and 10 hours and the temperature rise may last for a period of 2 days. The fired shapes are then cooled.

According to our process, the initial grains pass into the viscous phase, from which are formed larger monocrystals. The totality of the mass is not liquid at any one point in time. Passage into the liquid phase and then recrystallization is progressive. The shrinkage during the rise in firing temperature is less than 5 percent, and is frequently between 2 percent and 3 percent.

The advantages of our invention are shown by a comparison of photomicrographs of a brick made by a conventional process and a brick made according to the invention at 100× magnification. In the conventionally made brick the grains consist of 1,550°periclase monocrystals having a size of a few microns at most. The crystals are immersed in a ceramic matrix formed by small monocrystals analogous to those forming the grains. The monocrystals of periclase have not practically developed into the grains as well as into the binder.

The product made according to the invention consists essentially of monocrystals having dimensions approximately identical to each other which are generally between 20μ and 100μ. The structure is sufficiently close-set to prevent the appearance on a photomicrograph of crystals, referred to as "crystalline aggregates" into which the monocrystals are grouped. By contrast, these crystals may be seen under examination with magnification. Strips corresponding to concentrations of impurities and/or to novolatized residues of recrystallization additions appear at the boundaries of the crystals.

The following nonlimiting examples illustrate our invention.

EXAMPLE

Production of Magnesia Bricks of 220 × 110 × 60 mm.

The raw material was a dead burned or refractory material having an apparent specific gravity of 3.25 and a porosity of 5 percent. The chemical composition of the raw material was as follows:

| | |
|---|---|
| MgO | 98.1% by weight |
| $SiO_2$ | 0.6% |
| $Al_2O_3$ | traces |
| $Fe_2O_3$ | 0.5% |
| $TiO_2$ | traces |
| CaO | 0.8% |

A mixture was prepared containing, by weight:

| | |
|---|---|
| grains of 1.5 to 4 mm. | 30% |
| grains of 0.2 to 1.5 mm. | 30% |
| powder, smaller than 0.1 mm. | 35% |
| monocalcic silicate, melted and crushed to a maximum size of 74 microns | 4% |
| organic binder (bisulphite lye) | 1% |

This mixture was tempered and shaped in a hydraulic press at 1,000 kg./cm.². Its specific gravity when crude and dry was 3. The firing temperature of 1,650° C. was reached in 2 days and was maintained for 4 hours. Cooling was performed in 24 hours. The linear shrinkage during firing amounted to 3 percent, and the weight loss during firing amounted to 4 percent of dry.

The composition of the final product was, by weight:

| | |
|---|---|
| MgO | 97.5% |
| $SiO_2$ | 0.8% |
| $Al_2O_3$ | traces |
| $Fe_2O_3$ | 0.5% |
| CaO | 1.2% |

Periclase crystals of 400 to 800 microns clearly appeared under magnification and monocrystals between approximately 20 and 100 microns were visible.

The characteristics of the fired bricks were:

| | |
|---|---|
| apparent specific gravity | 3.20 |
| open porousness | 1% |
| mechanical strength (crushing cold) | 1,500 kg./cm.² |
| breaking modulus, cold | 400 kg./cm.² |
| subsidence under load of 2 kg./cm.²: | |
| at 1,680° C. | 0.5% |
| at 1,720° C. | 2% |
| creep under load, 24 hours at 1,500° C. followed by 2 kg./cm.² for 100 hours at 1,500° C.: | 0.2% |

The bricks according to this example are indeed unusual. Most magnesite refractory bricks have an apparent porosity in excess of 15 percent and an apparent specific gravity of less than 3.00. The unusual properties are the result of the use of a transient viscous phase of high vapor pressure as an ingredient in the brickmaking batch in amounts between about 3 and 6 percent. The unusually good, high temperature load strength of these bricks is the result of high density and small amounts of fluxing impurities, notwithstanding they were added to the brickmaking batch.

By way of example, the following other brickmaking batches are suitable for use in the process according to this invention:

| | | | | | |
|---|---|---|---|---|---|
| Dead burned Magnesia | 60% | 20% | 50% | 92% | 85% |
| Chrome ore | 36% | 76% | | | |
| Titania ($TiO_2$) | | | | 2% | |
| Chrome oxide ($Cr_2O_3$) | | | | | 10% |
| Calcined dolomite | | | 46% | | |
| Calcium silicate material | 4% | 4% | 4% | 6% | 5% |

While the scientific basis of the applicants' invention is not entirely understood, applicants have found that large additions of certain materials to basic brickmaking batches that normally would have been expected to be detrimental to the refractoriness of the resulting brick (as measured, for example, by high temperature load tests) actually improve refractoriness. The additions of calcium silicate materials in amounts between 3 and 6 percent results in the formation of a viscous phase during burning. The grains of the brickmaking batch at least partially pass through this phase in a progressive manner to become larger monocrystals. An overall shrinkage occurs. Moreover, the viscous phase is transient, that is, during the firing the calcium silicate materials diminish in quantity such that the resulting brick or shape has increased refractoriness.

Having thus disclosed the invention in detail and with the particularity required by the Patent Laws, what is desired protected by Letters Patent is set forth in the following claims.

We claim:

1. A method for producing a high density, low porosity thermally stable burned refractory shape comprising:

A. preparing a size graded batch consisting essentially of about 3 to 6 percent by weight calcium silicate materials, sized less than 74 microns, 0.2 to 1 percent by weight of an organic binder, at least 20 percent by weight dead burned magnesia and the remainder of the batch comprising refractory grains selected from the group consisting of chrome ore, calcined dolomite, $TiO_2$, $Cr_2O_3$ and mixtures thereof:

B. forming the batch into a shape;

C. firing the shape at a temperature between 1,550° C. and 1,680° C.; and

D. cooling and recovering a shape having a homogeneous structure of monocrystals and a porosity less than 8 percent.

2. A process according to claim 1 wherein said batch comprises between 20 and 80 percent dead burned magnesia.

3. A process according to claim 1 wherein said batch comprises at least 92 percent dead burned magnesia.

4. A process according to claim 1 wherein the brickmaking batch comprises about 4 percent the calcium silicate.

5. A burned refractory product having high density, low porosity and being thermally stable, prepared from a batch consisting essentially of about 3 to 6 percent by weight of calcium silicate materials sized less than 74 microns, 0.2 to 1 percent by weight of an organic binder, at least 20 percent by weight dead burned magnesia and the remainder of the batch comprising refractory grains selected from the group consisting of chrome ore, calcined dolomite, $TiO_2$, $Cr_2O_3$ and mixtures thereof, said product having been burned at a temperature between 1,550° C. and 1,680° C. such that said shape has comprised a homogeneous mixture of crystals and has a porosity less than 8 percent.

UNITED STATES PATENT OFFICE
CERTIFICATE OF CORRECTION

Patent No. 3,652,306　　　　　　　　Dated　- March 28, 1972

Inventor(s)　Jean-Pierre Kiehl et al.

It is certified that error appears in the above-identified patent and that said Letters Patent are hereby corrected as shown below:

Column 2, line 56 "1,500° C" should read -- 1,550° C --.
Column 3, line 1, "1,550°" should read -- small --.

Signed and sealed this 15th day of August 1972.

(SEAL)
Attest:

EDWARD M. FLETCHER, JR.　　　　　　　ROBERT GOTTSCHALK
Attesting Officer　　　　　　　　　　Commissioner of Patents